(12) United States Patent  
Cudak et al.

(10) Patent No.: US 11,968,519 B2  
(45) Date of Patent: Apr. 23, 2024

(54) DIRECTIONAL AUDIO PROVISION SYSTEM

(71) Applicant: Lenovo (Singapore) Pte. Ltd., Singapore (SG)

(72) Inventors: Gary D Cudak, Raleigh, NC (US); CheKim Chhuor, Shanghai (CN); Nathan Peterson, Oxford, NC (US); John M Petersen, Wake Forest, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 160 days.

(21) Appl. No.: 17/743,021

(22) Filed: May 12, 2022

(65) Prior Publication Data

US 2023/0370802 A1  Nov. 16, 2023

(51) Int. Cl.
*H04R 25/00* (2006.01)
*G06F 3/01* (2006.01)
*G10K 11/26* (2006.01)
*H04R 3/12* (2006.01)
*H04S 7/00* (2006.01)

(52) U.S. Cl.
CPC ............. *H04S 7/303* (2013.01); *G06F 3/012* (2013.01); *G10K 11/26* (2013.01); *H04R 3/12* (2013.01)

(58) Field of Classification Search
CPC . H04R 5/02; H04R 1/08; H04R 1/403; H04R 3/12; H04R 1/326; H04R 2499/13; H04R 2420/07
See application file for complete search history.

(56) References Cited

U.S. PATENT DOCUMENTS

2013/0163382 A1* 6/2013 Millar .................... G01S 13/46  
367/127

* cited by examiner

*Primary Examiner* — Amir H Etesam  
(74) *Attorney, Agent, or Firm* — FERENCE & ASSOCIATES LLC

(57) ABSTRACT

One embodiment provides a method, the method including: detecting, at an audio provision system including at least one audio output device, an initiation of audio being provided via the at least one audio output device to a user; identifying and tracking, using at least one sensor of the audio provision system, a location of the user with respect to the at least one audio output device; and directing, using the audio provision system, audio provided by the at least one audio output device to the user, wherein the directing includes adjusting, based upon the location of the user, at least one attribute of the at least one audio output device, wherein the adjusting includes iteratively adjusting the at least one attribute as the location of the user changes. Other aspects are described and claimed.

20 Claims, 4 Drawing Sheets

DIRECTIONAL AUDIO PROVISION SYSTEM

BACKGROUND

When a person listens to audio (e.g., music, podcast, phone call, etc.) they will generally use some form of wearable audio device around and/or within their ears (e.g., headphones, earbuds, etc.). The use of a wearable audio device becomes more prominent when a person is in a public setting and does not want to disrupt others within a listening distance (e.g., in the home, at the office, etc.). The use of a wearable audio device may also assist a user in hearing and understanding audio at a greater level by directing audio into the ear and minimizing external audio influence. Depending on a connection type of a wearable audio device to an information handling device providing the audio (e.g., smartphone, laptop, PC, etc.), a user's ability to move around and/or multitask while consuming audio can become restricted.

BRIEF SUMMARY

In summary, one aspect provides a method, the method including: detecting, at an audio provision system including at least one audio output device, an initiation of audio being provided via the at least one audio output device to a user; identifying and tracking, using at least one sensor of the audio provision system, a location of the user with respect to the at least one audio output device; and directing, using the audio provision system, audio provided by the at least one audio output device to the user, wherein the directing includes adjusting, based upon the location of the user, at least one attribute of the at least one audio output device, wherein the adjusting includes iteratively adjusting the at least one attribute as the location of the user changes.

Another aspect provides a system, the system including: at least one audio output device; at least one sensor; a processor operatively coupled to the at least one audio device and the at least one sensor; a memory device that stores instructions that, when executed by the processor, causes the information handling device to: detect, at the at least one audio output device, an initiation of audio being provided via the at least one audio device to a user; identify and track, using the at least one sensor, a location of the user with respect to the at least one audio output device; and direct audio provided by the at least one audio output device to the user, wherein the directing includes adjusting, based upon the location of the user, at least one attribute of the at least one audio output device, wherein the adjusting includes iteratively adjusting the at least one attribute as the location of the user changes.

A further aspect provides a product, the product including: a computer-readable storage device that stores executable code that, when executed by a processor, causes the product to: detect, at an audio provision system including at least one audio output device, an initiation of audio being provided via the at least one audio device to a user; identify and track, using at least one sensor of the audio provision system, a location of the user with respect to the at least one audio output device; and direct, using the audio provision system, audio provided by the at least one audio output device to the user, wherein the directing includes adjusting, based upon the location of the user, at least one attribute of the at least one audio output device, wherein the adjusting includes iteratively adjusting the at least one attribute as the location of the user changes.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
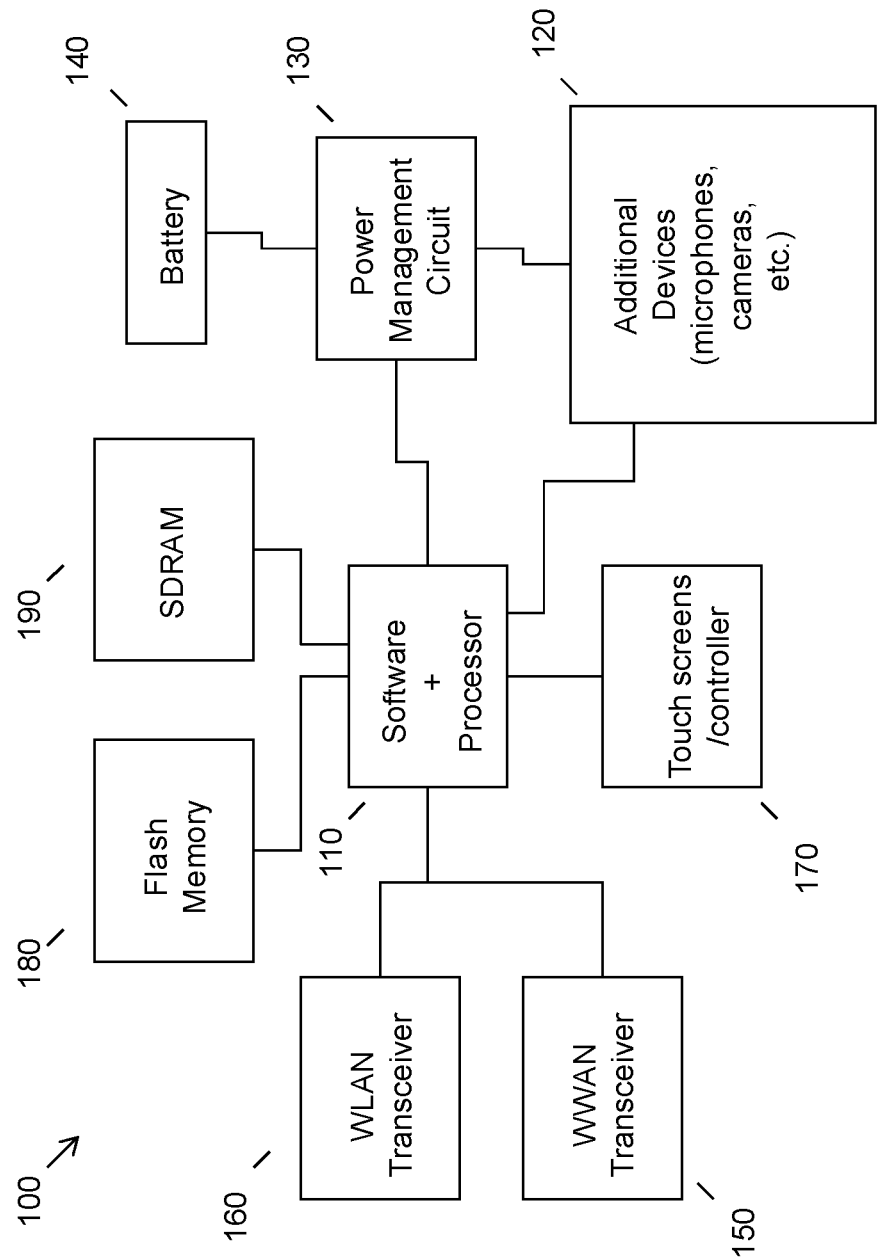
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When a user desires to move around while listening to a wearable audio device, multiple aspects associated with a current device in use may restrict a user's movement. For example, a user who has wired headphones connected to a laptop and is listening to a prerecorded lecture would have to carry around the laptop while ensuring that the headphones remain plugged into the device. As another example, if a user is listening to music through wired headphones connected to a smart phone, the user may move around a bit more easily since a smartphone can fit in a user's pocket. However, the presence of an external wire running along a user's front/side from their ears to the connection point in their pocket presents the issue of the headphone wire getting snagged on other objects a user may regularly move past (e.g., door knobs/handles, dresser drawers, etc.).

Forms of wireless connection, for example, through a network device, near-field communication device, short-range communication device, and/or the like, have been implemented into a plurality of devices to replace the use of wired headphones. This use of wireless headphones may assist a user in not getting their headphones and/or cords of the headphones snagged on objects. However, wireless headphones face their own set of usage issues. The use of wireless headphones relies heavily on the user ascertaining that the wireless headphones are charged. Since the wire connecting the headphones to the device has been removed, in order to power wireless headphones batteries in each individual headphone must be charged in order to use.

Additionally, because the headphones are wireless, if a set of wireless headphones, or wireless earbuds, slip off a user's head or fall out of a user's ear, the wearable audio device may fall to floor and become damaged. Movement may dislodge a wearable audio device from a user, and upon a sudden motion, it is common for wireless headphones and earbuds to become free and thereafter damaged after impact. Additionally, after prolonged periods of use, wired or wireless headphones may become uncomfortable or even painful to continue to use.

A device supplying audio can be connected to a speaker setup to output audio without the need of a wearable audio device of some form. Speakers may openly output audio across a large distance. The use of speakers may negate the issues outlined above regarding the use of headphones, both wired and wireless. Speakers can provide a desired audio to a user without the need to maneuver and/or carry a device supplying the audio, are connected directly to a power source, speakers may not be worn and then become dislodged leading to potential damaging, and the speakers do not become uncomfortable because they are not worn. However, the use of speakers can disrupt additional people within a listening range of the speaker. Being that the sound is output at a much higher volume from a speaker, or setup of speakers, than from a pair of headphones, disruptions to those within a certain distance is imminent.

In an attempt to reduce disruption to others present within a range of a speaker outputting audio, directional speakers may be utilized that may direct sound being emitted from the speaker to a user present within a specific zone at a specific distance from the speaker. This directing of sound waves to a specific location may permit the user to listen to audio being provided from the speaker. However, moving from this specific location, or zone, associated with the directional speaker will result in the user no longer hearing the audio, which is the feature that prevents other within the space from being disrupted by the audio. A user must remain stationary in the location specified in order to hear the audio being provided by the directional speaker, and upon moving from that location, a user will no longer hear the audio without moving the speaker. Therefore, the movement of a user while listening to audio is once again restricted. Thus, what is needed is a system that can provide the user with audio via a speaker setup that also permits a user to move around while listening.

Accordingly, the described system and method provides a technique for directing audio to a user by use of an audio provision system. The audio provision system may utilize an audio output device (e.g., a speaker) to provide audio to an identified user at a determined distance from the audio provision system. A user may then be tracked by the audio provision system while in use to direct the audio to a user as they move about an environment. The audio provision system may determine a distance a user is from the audio output device and provide the audio to the user as long as the user remains within the determined distance from the system. Directing the audio output from the system to the user may permit a user to continuously hear the audio being provided while also negating any disruptions to others located near an audio provision system. Therefore, a system provides a technical improvement over traditional methods for providing audio output to a user with minimal disruptions to additional persons within an environment of the audio provision system.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
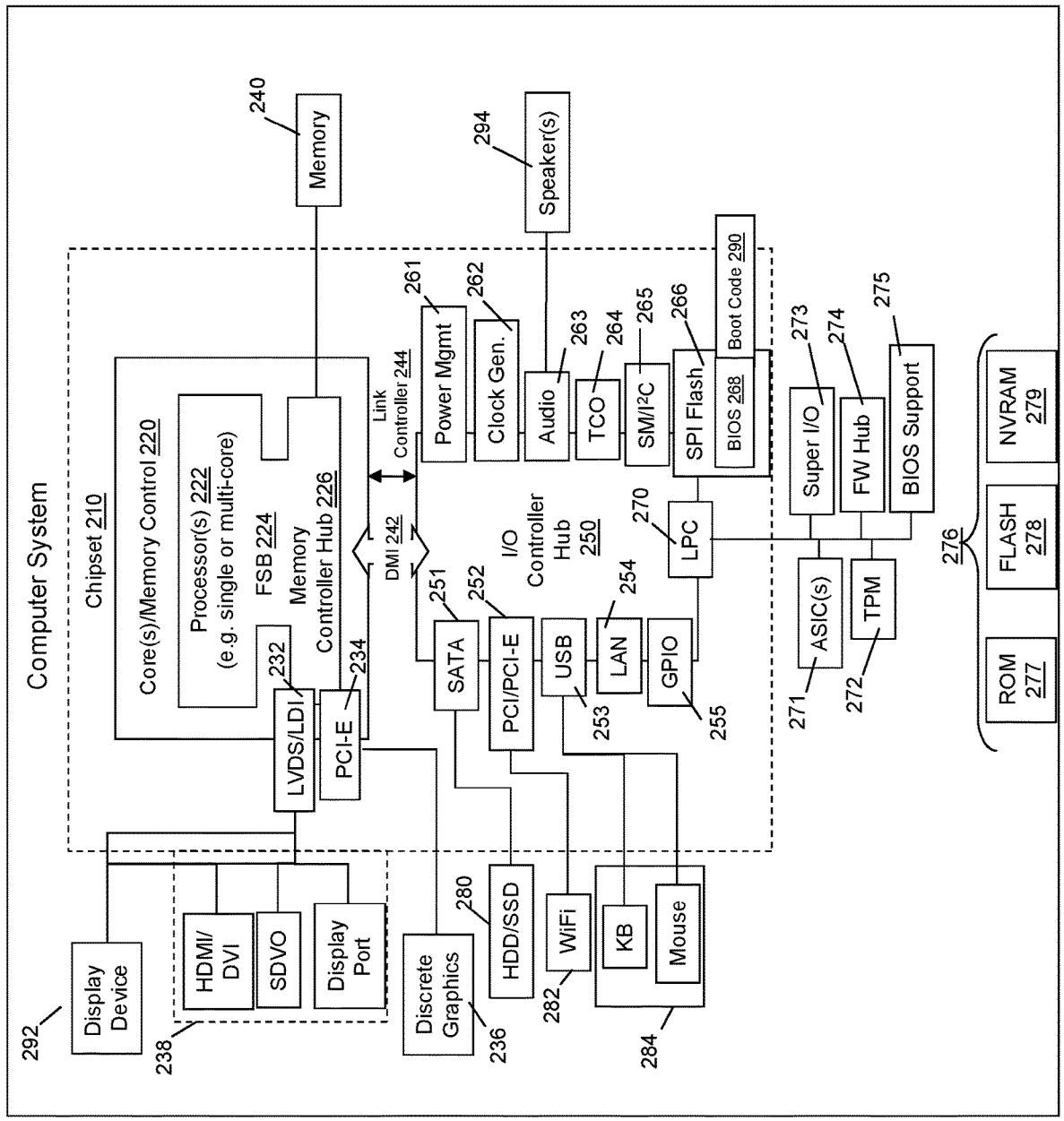
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in detection systems and/or audio outputting systems. For example, the circuitry outlined in FIG. 1 may be implemented in a tablet or smart phone embodiment, whereas the circuitry outlined in FIG. 2 may be implemented in a personal computer embodiment.

Figure 3:
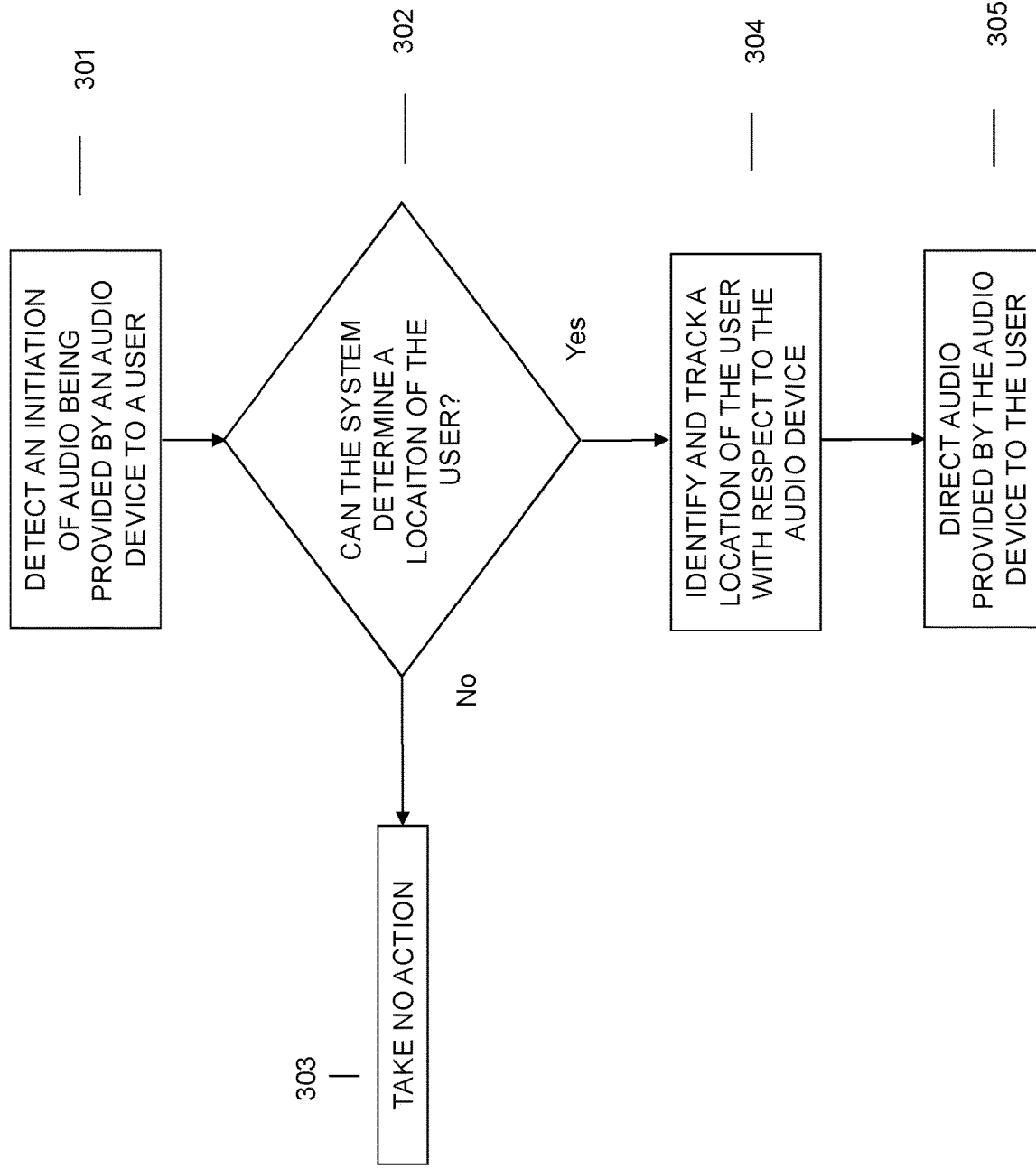
FIG. 3 illustrates an example method for directing audio being provided by an audio output device to a user moving about an environment.

FIG. 3 illustrates an example method for directing audio being provided by an audio output device to a user moving about an environment. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to direct audio output to a user by use of an audio provision system. Additionally, the audio provision system includes modules and features that are unique to the described system.

At 301, the audio provision system may detect an initiation of audio being provided by an audio output device to a user. The system may detect the initiation of audio by, for example, detection of a command provided to the audio provision system, detection of a user at a location associated with an initiating of an audio output, detection of a selection of an audio output type at the audio provision system, and/or the like. When detecting the initiation at the audio provision system, the system may use one or more sensors coupled to the audio provision system to capture user data. The one or more sensors may capture a plurality of detection-type data associated with the user.

For example, at the audio provision system, the user may select an audio file associated with a story describing an article on display at a museum, and upon the system detecting the selection of the audio file, the system may queue and then output the audio file to the user. In this example, the selection and thereafter detection of the initiation may be detected by use of a touch sensor present on a display coupled to the audio provision system. As another example, the user may provide an audible command to a digital personal assistant coupled to the audio provision system requesting a song to be played. The system may detect this command, or initiation, provided by the user, and then output the song from at least one audio output device (e.g., a speaker) to the user.

When detecting the initiation provided by the user at the audio provision system, the audio provision system may be implemented on a plurality of information handling device types. However, the audio provision system in use will only trace back to the information handling device in which a user is interacting with, even if one or more devices employ an audio provision system. In other words, the audio provision system that is employed at any time may be the audio provision system that corresponds to the device with which the user is interacting and providing instructions to provide audio output. The audio provision system may be implemented on, for example, a smartphone, a laptop and/or personal computer, a tablet, smart television, and/or any other information handling device that has access to a speaker or other audio output device. Throughout this specification, the audio provision system in use may be with relation to a computer, but it is important to note that this is a non-limiting example and is merely utilized for illustrative purposes.

Additionally, when detecting an initiation of the audio being provided to the user, at 301, the audio provision system may detect a context of the environment surrounding the user and the audio provision system. The context of the user may influence how the audio being output may be supplied to the user. The context may account for a volume level of an environment the user is present in. Depending on the volume level of the environment, the audio provision system may make slight adjustments to audio output characteristics, for example, direction of audio output, volume of audio output, range of audio output (e.g., further distance, wider left-to-right distance or range, etc.). As an example, for a context determined to contain little to no external volume influence (e.g., quiet room, library, museum, etc.), the audio being outputted to the user from the audio output device of the audio provision system may remain at a standard level or even a reduced level, a standard range or even a greater range, a standard distance or even a greater distance, and/or the like.

However, in an embodiment when the context of the user is determined to contain a high-volume level (e.g., public area, mall, concert, etc.), the characteristics associated with the audio output being supplied from the audio output device of the audio provision system may be heavily influenced. For example, the level of volume for the audio being outputted to the user from the system may be increased for a user to understand the audio output. Additionally, or alternatively, further characteristics may be adjusted to assist with providing audio output to the user from the audio output device of the audio provision system, depending on the context. These characteristics may include, for example, adjusting a bass level of the audio, the treble associated with the audio, a frequency level of the audio being output, and/or the like.

In the example of a high-level of contextual volume, the audio provision system may, for example, decrease a bass level of an audible output of a voice describing a painting in a packed art gala. The adjusting of the bass level may permit a user to hear a clearer pronunciation of the terms in the description being provided in the audio output. In another example for the context with a high-volume level, adjusting the frequency of the sound waves transmitting the audible output to the user may also provide clarity when receiving an audible output, because an adjustment in frequency may seemingly pierce through commotion that is not moving at the same rate.

Detecting the context of the user and the audio provision system may also account for additional persons present in determined environment. When detecting the context surrounding the user, the audio provision system may utilize one or more sensors to determine a number, which may not be a specific number, but rather a level, of people within the environment. Establishing an amount or number of people within a range of the user made assist the system when adjusting characteristics of the audible output, as discussed in more detail herein. Additionally, the system may detect context data identifying the proximity of the other people to the audio provision system.

Detection of the context may also, or alternatively, include detecting a proximity of the other people present in relation to the user. The possibility of a non-user hearing the audio output being provided to the user may be measured from at least one of, if not both, the audio output device of the audio provision system and/or the user. Being that the system directs the sound from the audio output device to the user, proximity from where the sound is being provided from (e.g., the speaker) and proximity from where the sound is being provided to (e.g., the user), may influence audio output characteristics in order to minimize or eliminate the audio output being heard by a non-user.

Detection of the context of the user may also include detecting a location of the user within the environment and/or with respect to the audio output device. The audio provision system may use one or more sensors and sensor-types to capture information surrounding the user and related to the environment and thereafter establishing the context of the user. For example, a sensor operatively coupled to the audio provision device may capture image data of a wall orientated behind the user ad containing a calendar and a whiteboard, and then determine that the user is at work. Context information describing the location of the user may then be stored in a storage device, and may thereafter be referenced in the future when detecting the context of the user.

Additionally, a user's location may include specific sounds that may assist the audio provision system in detecting an environment surrounding the user. For example, in an embodiment, the audio provision system may detect church bells ringing at 10:00 AM. The audio provision system may then access the storage device to determine if the ringing of church bells is associated with a user location. The system may then determine that the presence of church bells means that the user is at their office, and the context of the user may be determined to be at work. Context of the user may highly influence how audio is outputted to the user.

After detecting the initiation of audio being provided by at least one audio output device to the user, at 301, the audio provision system may, at 302, determine if the system can identify a location of the user with respect to the audio output device associated with the audio provision system. In identifying the location of the user, the determined current context of the user and the audio output device of the audio provision system may set boundaries associated with a permitted degree of motion present while utilizing the system. In other words, the context of the user and the audio output device establishes where a user can and cannot go while to utilizing the audio provision system.

If the system determines, at 302, that a location of the user cannot be determined, for example, because the user is outside of the range of the audio output device, the system may take no action, at 303. Taking no action, at 303, includes providing audio from the audio output device with no changes to the audio output.

However, when the system can determine the location of the user, at 302, the audio provision system may identify and track a location of the user with respect to the audio output device of the audio provision system, at 304. The system may also identify the context of the user while identifying and tracking the location of the user. In identifying and tracking a location of the user, the system may use one or more sensors of the audio provision system to perform such tasks. When describing the identifying and tracking methodology disclosed herein, the description may seem as though the tracking is happening subsequently to the identifying. However, it should be understood that the identifying and the tracking of the location of the user with respect to at least one audio output device of the audio provision system may occur simultaneously, serially, a combination thereof, and/or the like.

Identifying and tracking of the user with respect to the audio output device, at 304, may be performed utilizing one or more sensors. The sensor may initially identify, while the audio output device is providing audio output to the user at 301, a location of the user with respect to the audio output device and/or within the environment. Upon the initiation, at 301, the audio provision device may begin tracking the user. Tracking the user may include utilizing one or more sensors to provide location information regarding the user position while present in the context, which also includes an audio output device of the audio provision system. A user may change their position while the system is in use, and the identifying and tracking of the user at 304, while in a contextual environment identified by the audio provision system, may permit the system to determine if the audio being provided by the audio output device can be heard by the user, and may also determine if any additional people within the environment may hear the audio being outputted for the user. Thus, the identifying and tracking of the user may influence characteristics of the audio being output, such as the direction the audio output device outputs the audio, the volume of the audio output device, the range of the audio output, and/or the like.

Identifying the user, at 304, may include identifying a distance of the user from an audio output device. Identifying the distance of the user from the audio output device may assist in adjusting audio output characteristics when supplying the audio output to the user. For example, if a user is identified to be standing at a distance further away from the device than a standard volume level may be set, the audio provision system may increase the volume of the audio output to ensure a user can hear. Additionally, or alternatively, the identified distance from the user to an audio output device may further determine an amount of context data that may influence audio output characteristics.

Identifying may also include determining the identity of the user. As mentioned previously, a storage device accessible by the audio provision system may store data collected by the audio provision system, and such information may be referenced. Collecting of data may include recording user characteristic data, and thereafter establishing profiles for each user of the audio provision system. For example, one or more sensors coupled to the audio provision system may capture image data of a user named John, and after providing an initiation to play a song, the audio provision system may store the initiation type in the storage device in a profile associated with the user John.

Additionally, or alternatively, a profile for a user may grow overtime and with each use of the audio provision system, and may further include physical characteristics of the user to assist in providing high quality, directional audio output to the user. The one or more sensors present in the system may capture, for example, image data of the user depicting a size of the user. The audio provision system may attempt to direct audio output directly to the head of a user to assist in providing the audio output to the user. More specifically, directing the audio output to the user's head is ideally directing the audio output to a user's ears. By minimizing and/or condensing the soundwaves of the audio being output to a user by directing the sound to a narrower target, the system may provide high-quality audio while restricting the audio to only be heard by the user. Therefore, capturing image data describing physical characteristics of a user, for example, overall height, shoulder height, age, and/or the like, may assist in providing audio output to a user alone from an audio output device. It should be noted that while a single user is referred to herein as the target user, a group of users may also be a target user.

Determining a distance of the user to the audio output device, the height of a user, and/or other characteristics, may utilize one or more sensors. For example, one or more time of flight (ToF) sensors may be used to determine user characteristics. ToF sensors may determine a distance from a first point to a second point by reflecting a signal off a second point and providing the information back to the ToF sensor at the first point. The sensor identifies how long the reflection of the signal took to return back to the sensor, and subsequently calculates an accurate distance from this data. As another example, time difference of arrival (TDoA) sensors, received signal strength (RSSI) sensors, and angle of arrival (AoA) sensors may be utilized to perform distance and/or position determinations.

Use of a TDoA and a AoA sensor may require additional sensors in order to perform accurate distance measurements. For example, tilizing a TDoA sensor, at least two sensors present in the context, may be utilized to determine a distance of an arrival from multiple orientations, which may thereafter be used to calculate an accurate position of the user. As for the AoA sensor, such a sensor may require the user to be wearing a sensor in communication with the AoA sensor (e.g., a smart watch), which may collect distance information associated with the angle of receipt, and may subsequently perform distance calculations from this collected data. In an embodiment, an RSSI sensor does not require additional sensors in the context, but rather requires a transmission sensor from the user and measures a signal strength from a singular location in the context.

Utilizing one or more of these sensors in the audio provision system may permit accurate tracking of a user's position and location, at 304, with respect to the audio output device and within the context of the environment. As the user moves through an environment, the user may be tracked to determine their location and/or position. Tracking the user while in the environment may continuously transmit location data of the user back to the audio provision system to assist in directing audio from an audio output device to the user, at 305. Continuous calculation of a user's exact location while in the context of the determined environment may assist in providing audio output to the target user(s) only.

Thus, as the user moves about an environment, continued receipt of the audio by the user from the audio output device of the audio provision system will continue until the completion of an audio output, or if a user leaves the determined environment associated with the audio provision system. In other words, if a user moves too far away from an audio output device, as determined by the audio provision system, then audio output may stop or pause. A position of the user with respect to the audio output device may ultimately determine a user's ability to receive directional audio output from the system.

As a user remains in the environment and attempts to receive audio output while moving through the determined contextual environment, the location and position data collected at 304 may assist the audio provision system with directing, at 305, audio provided from an audio output device to a user. Directing audio being provided to a user may include adjusting one or more attributes of the audio output device. Adjusting the one or more attributes may occur in real-time with respect to the location and position data obtained by one or more sensors of the audio provision system. As the position of the user changes in the context of the environment, the audio provision system may adjust attributes of the audio output device to ensure that the audio output is being provided to the user and minimizing disruption to others within the environment that do not want to hear the audio.

When directing the audio output device, the system may utilize a parabola surrounding the speaker of the audio output device. A parabola surrounding the speaker may be a round shape with an open-side that may force soundwaves being output by an audio output device to move in a single direction. In other words, the parabola surrounding the speaker is a hemisphere with the open, flat side orientated in the same direction as the speaker. Such a shape may condense directions in which sound waves may travel out of the parabola, which may thereafter be directed to a user's head. Thus, in one example, the audio output device is a parabolic speaker.

When adjusting one or more attributes, the audio provision system may determine which attribute may be adjusted based upon a minimal amount of change in order to maintain directing the sound being outputted to the user's head. In other words, rather than making multiple adjustments to the audio output device, the system may attempt to make minimal changes to the position of the audio output device to continue providing audio to the user in an environment. For example, if a user moves a foot to the left while receiving audio output, the audio output device may adjust a lateral setting of the audio output device only. Adjustments made to the audio output device based upon the position of the user of the audio provision device may occur in real-time, and may be iteratively adjusted while the user moves.

Depending on the amount of movement, adjustments may not need to be made but the system may perform the calculation to determine if adjustments do need made. In other words, some movements may be small enough that the audio is still being directed at the user, thus the system may determine whether adjustments need to be made, but may thereafter determine that adjustments do not need to be made.

Adjusting an attribute of the audio output device may result in adjusting an output direction of the audio output device. As mentioned previously, as one example, the audio output device may my adjusted laterally. Additionally, or alternatively, adjusting an attribute of the audio output device may include adjusting a longitudinal aspect of the audio output device. For example, if user moves closer to the audio output device, the user would be interpreted as getting bigger. Thus, the position of a user's head may increase or move upward, in relation to a sensor. To account for this change, an adjustment may include increasing the height of the audio output device.

Additionally, or alternatively, with respect to adjusting a latitudinal attribute and/or a longitudinal attribute of the audio output device, an angle in relation to a horizontal and/or vertical axis may be utilized. In other words, rather than adjusting the audio output device to ensure that the output portion of a parabola remains constant with an horizontal and vertical axis (opening remains square and the position of the entire audio output device moves), an angle of the audio output device may be adjusted, thereby permitting the directing of the opening of the parabola of the user without the need to move the entire audio output device.

Adjusting one or more attributes may also include, adjusting a characteristic of the audio itself, for example, an output volume, bass level, treble level, a frequency of the audio, and/or the like. For example, in an environment that includes a context having a high-volume level, the audio provision system may increase an output volume to overcome external noise influence. As another example, in an environment with a context consisting of a low-volume level, the audio provision system may decrease a volume if it is determined that an additional person within the environment can hear the audio output. Adjusting audio characteristics may increase comprehension of audio being outputted to the user and minimize disruption caused by the audio output to another user.

Figure 4:
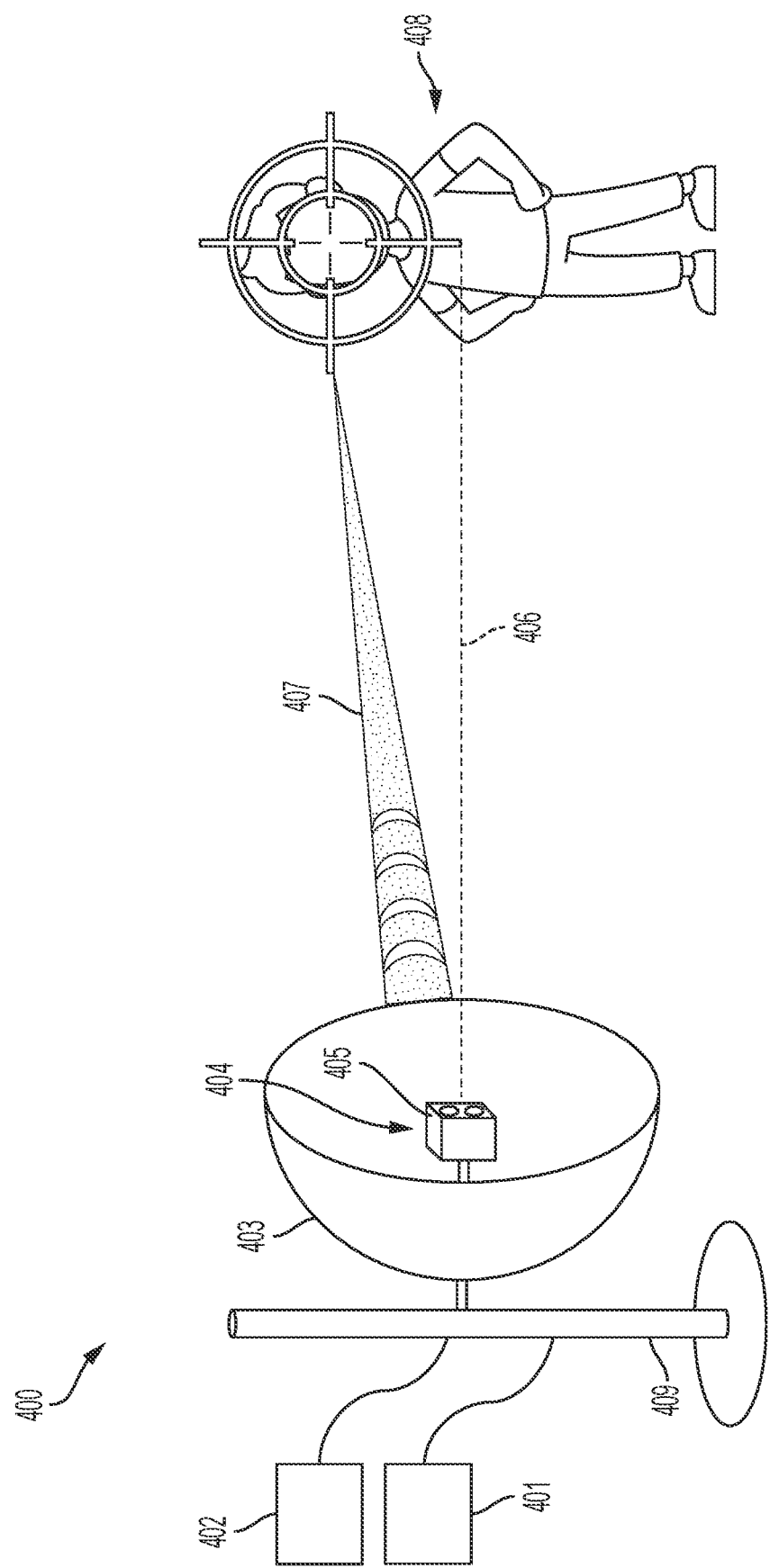
FIG. 4 illustrates an example directional audio provision system set-up consisting of a single parabolic speaker.

An example audio provision system is provided at FIG. 4. FIG. 4 provides an example setup of an audio provision system 400 containing a single parabolic audio output device. In order to power on the system 400, the system may be connected to a power source 401. Additionally, in order to provide audio through the audio output device, an audio source 402 may also be connected to the system. As can be seen in system 400, power source 401 and audio source 402 are connected to the rest of the system 400 through the stand 409 of the audio provision system 400. On the opposite side of the stand 409, the parabola 403 surrounding the audio output device 404 and the ToF sensor 405 are connected to the system 400. The audio output device 404 and associated audio output directing components, including the parabola 403 and ToF sensor 405, may be utilized to adjust one or more attributes to accommodate the user 408 while the user 408 is moving through the environment.

Prior to adjusting attributes of the system 400, the ToF sensor 405 may be used to determine a distance of the user from the audio output device, as seen at 406. This distance represented at 406 may be continuously measured to identify and track the position and/or location of the user with respect to the audio output device 407. From the data captured by the ToF sensor 405 indicating the distance 406 of the user 408 from the audio output device 404, the audio provision system 400 may calculate a position of the user's 408 head, and thereafter direct the audio output 407 to the head of user 408. As the user 408 moves about the environment, ToF sensor 405 will continue to identify and track the position of the user to provide information to system 400, and upon determination that the user 408 is moving, the system 400 will be used to adjust one or more attributes at the audio output device 404 and the parabola 403. This adjusting of attributes based on the position of the user will reduce or eliminate the disruption to other people within the environment that may be caused by the output audio.

The various embodiments described herein thus represent a technical improvement to conventional methods for providing audio to a user within an environment. Rather than using traditional methods that require the use of headphones or earbuds, and traditional speakers lacking an adjustable orientation, the described system and method utilizes an directional audio provision system to detect an initiation of an audio output device providing audio to a user, identify and track the position of the user in the context of a determined environment, and thereafter adjust one or more attributes of an audio output device of the audio provision system to direct the audio output to be heard by the user, thereby reducing disruption to other users who may be present in the environment. The system is able to use one or more techniques to identify and track a user within an environment, and subsequently calculating the necessary adjustments to be made in real-time in order to direct audio output to the user. Such embodiments may allow a system to iteratively adjust the direction in which an audio output device is outputting audio to a user of the directional audio provision system without disrupting others.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
    detecting, at an audio provision system comprising at least one audio output device, an initiation of audio being provided via the at least one audio output device to a user;
    identifying and tracking, using at least one sensor of the audio provision system, a location of the user with respect to the at least one audio output device; and
    directing, using the audio provision system, audio provided by the at least one audio output device to the user, wherein the directing comprises adjusting, based upon the location of the user, at least one attribute of the at least one audio output device, wherein the adjusting comprises iteratively adjusting the at least one attribute as the location of the user changes.

2. The method of claim 1, wherein the identifying and tracking a location comprises identifying and tracking a location of a head of the user.

3. The method of claim 1, comprising detecting a context of the user and wherein the adjusting is based upon the context of the user.

4. The method of claim 1, wherein the adjusting at least one attribute comprises adjusting a parabola of the at least one audio output device.

5. The method of claim 1, wherein the adjusting at least one attribute comprises adjusting an output volume of the at least one audio output device.

6. The method of claim 1, wherein the adjusting at least one attribute comprises adjusting an output direction of the at least one audio output device.

7. The method of claim 1, wherein the identifying and tracking a location of the user comprises identifying and tracking a distance of the user from the at least one audio output device.

8. The method of claim 1, wherein the identifying and tracking a location of the user comprises identifying and tracking a position of the user with respect to the at least one audio output device.

9. The method of claim 1, wherein the at least one audio output device comprises a parabolic speaker.

10. The method of claim 1, wherein the at least one sensor comprises a distance measurement sensor.

11. A system, the system comprising:
    at least one audio output device;
    at least one sensor;
    a processor operatively coupled to the at least one audio device and the at least one sensor;
    a memory device that stores instructions that, when executed by the processor, causes the information handling device to:
    detect, at the at least one audio output device, an initiation of audio being provided via the at least one audio device to a user;
    identify and track, using the at least one sensor, a location of the user with respect to the at least one audio output device; and
    direct audio provided by the at least one audio output device to the user, wherein the directing comprises adjusting, based upon the location of the user, at least one attribute of the at least one audio output device, wherein the adjusting comprises iteratively adjusting the at least one attribute as the location of the user changes.

12. The system of claim 11, wherein the identifying and tracking a location comprises identifying and tracking a location of a head of the user.

13. The system of claim 11, comprising detecting a context of the user and wherein the adjusting is based upon the context of the user.

14. The system of claim 11, wherein the adjusting at least one attribute comprises adjusting a parabola of the at least one audio output.

15. The system of claim 11, wherein the adjusting at least one attribute comprises adjusting an output volume of the at least one audio output device.

16. The system of claim 11, wherein the adjusting at least one attribute comprises adjusting an output direction of the at least one audio output device.

17. The system of claim 11, wherein the identifying and tracking a location of the user comprises identifying and tracking a distance of the user from the at least one audio output device.

18. The system of claim 11, wherein the identifying and tracking a location of the user comprises identifying and tracking a position of the user with respect to the at least one audio output device.

19. The system of claim 11, wherein the at least one audio output device comprises a parabolic speaker.

20. A product, the product comprising:
a computer-readable storage device that stores executable code that, when executed by a processor, causes the product to:
detect, at an audio provision system comprising at least one audio output device, an initiation of audio being provided via the at least one audio device to a user;
identify and track, using at least one sensor of the audio provision system, a location of the user with respect to the at least one audio output device; and
direct, using the audio provision system, audio provided by the at least one audio output device to the user, wherein the directing comprises adjusting, based upon the location of the user, at least one attribute of the at least one audio output device, wherein the adjusting comprises iteratively adjusting the at least one attribute as the location of the user changes.

* * * * *